(12) United States Patent
Aruga

(10) Patent No.: US 11,829,658 B1
(45) Date of Patent: Nov. 28, 2023

(54) PRINTING SYSTEM AND METHOD OF CONTROLLING PRINTING SYSTEM

(71) Applicant: SEIKO EPSON CORPORATION, Tokyo (JP)

(72) Inventor: Kazushi Aruga, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/201,359

(22) Filed: May 24, 2023

(30) Foreign Application Priority Data

May 25, 2022 (JP) .................................. 2022-084937

(51) Int. Cl.
*G06F 3/12* (2006.01)

(52) U.S. Cl.
CPC ............ *G06F 3/121* (2013.01); *G06F 3/1207* (2013.01); *G06F 3/1234* (2013.01); *G06F 3/1259* (2013.01)

(58) Field of Classification Search
CPC ...... G06F 3/121; G06F 3/1207; G06F 3/1234; G06F 3/1259
USPC ....................................................... 358/1.14
See application file for complete search history.

(56) References Cited

U.S. PATENT DOCUMENTS

| 6,075,618 | A | * | 6/2000 | Nakai | ..................... G06F 3/126 358/1.14 |
| 6,672,695 | B1 | * | 1/2004 | Naka | ................... B41J 2/17546 347/7 |
| 11,733,933 | B2 | * | 8/2023 | Azechi | .................. G03G 21/00 358/1.14 |

FOREIGN PATENT DOCUMENTS

JP          2006-150889 A      6/2006

* cited by examiner

*Primary Examiner* — Allen H Nguyen
(74) *Attorney, Agent, or Firm* — Oliff PLC

(57) ABSTRACT

A printing system includes a printing device and a cartridge. The printing device includes a controller that controls the printing device to perform printing by executing a plurality of sequences, an error detector that detects an error that is likely to occur in one or more of the plurality of sequences, and a first storage unit in which information is recorded by the controller. The cartridge includes a cartridge storage unit in which information is recorded by the controller in a state in which the cartridge is attached to the printing device. The controller records, in the first storage unit, numbers and results of a plurality of sequences. When the error is detected, the controller records numbers of a predetermined number of sequences including the latest sequenced among the numbers of the sequences recorded in the first storage unit.

10 Claims, 6 Drawing Sheets

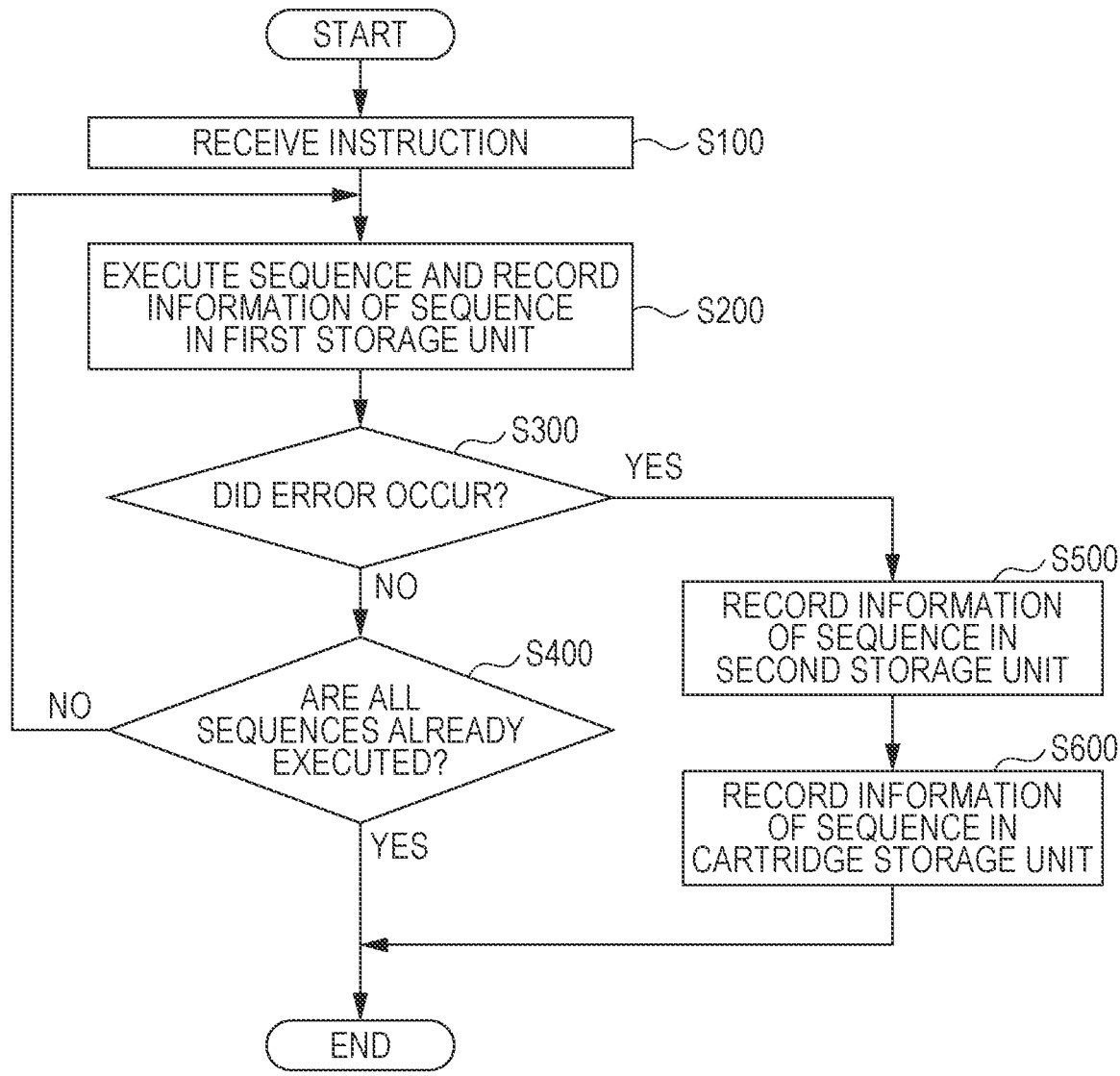

FIG. 4

| | Content of Error (SqE) | Sequence Number (Sequence Name) (SqN) | Result of Executing Sequence (SqR) | Instruction from User (SqI) |
|---|---|---|---|---|
| Sq10 | — | 0x01 (TURNING ON) | — | TURNING ON |
| Sq20 | — | 0x02 (WRITING OF AMOUNT CONSUMED DURING PRINTING) | — | PRINTING |
| Sq30 | — | CSIC-A03 (WRITING OF AMOUNT OF CARTRIDGE INK CONSUMED (DURING PRINTING)) | WRITTEN VALUE | — |
| Sq40 | — | CSIC-B80 (DETERMINATION ON WRITING AMOUNT CONSUMED FROM CARTRIDGE (DURING PRINTING)) | RESULT OF DETERMINATION | — |
| Sq50 | RUA COMMAND ERROR | CSIC-C01 (READING FROM CARTRIDGE MEMORY) | READ VALUE | — |

FIG. 5

| | | SqN | SqR | SqI |
|---|---|---|---|---|
| | CONTENT OF ERROR | SEQUENCE NUMBER (SEQUENCE NAME) | RESULT OF EXECUTING SEQUENCE | INSTRUCTION FROM USER |
| Sq10 | — | 0x01 (TURNING ON) | — | TURNING ON |
| Sq20 | — | 0x02 (WRITING OF AMOUNT CONSUMED DURING PRINTING) | — | PRINTING |
| Sq30 | — | CSIC-A03 (WRITING OF AMOUNT OF CARTRIDGE INK CONSUMED (DURING PRINTING)) | WRITTEN VALUE | — |
| Sq40 | — | CSIC-B80 (DETERMINATION ON WRITING AMOUNT CONSUMED FROM CARTRIDGE (DURING PRINTING)) | RESULT OF DETERMINATION | — |
| Sq50 | RUA COMMAND ERROR | CSIC-C01 (READING FROM CARTRIDGE MEMORY) | READ VALUE | — |

SqE

FIG. 6

| | SEQUENCE NUMBER (SEQUENCE NAME) | CONTENT OF ERROR |
|---|---|---|
| SqE | | |
| Sq10 | 0x01 (TURNING ON) | — |
| Sq20 | 0x02 (WRITING OF AMOUNT CONSUMED DURING PRINTING) | — |
| Sq30 | CSIC-A03 (WRITING OF AMOUNT OF CARTRIDGE INK CONSUMED (DURING PRINTING)) | — |
| Sq40 | CSIC-B80 (DETERMINATION ON WRITING AMOUNT CONSUMED FROM CARTRIDGE (DURING PRINTING)) | — |
| Sq50 | CSIC-C01 (READING FROM CARTRIDGE MEMORY) | RUA COMMAND ERROR |

SqN

PRINTING SYSTEM AND METHOD OF CONTROLLING PRINTING SYSTEM

The present application is based on, and claims priority from JP Application Serial Number 2022-084937, filed May 25, 2022, the disclosure of which is hereby incorporated by reference herein in its entirety.

BACKGROUND

1. Technical Field

The present disclosure relates to a printing system and a method of controlling a printing system.

2. Related Art

A facsimile that outputs information regarding an error is present. When an error occurs during a transmission operation, a reception operation, or a copy operation in a facsimile described in JP-A-2006-150889, the facsimile stores the status of a video interface (I/F) and the cause of the error in a nonvolatile memory. The cause of the error is the state of a paper presence sensor, the state of a paper position sensor, the temperature of a heater, or a timer value. When the error is an error of a recording system, the status of the recording system and the cause of the error are printed. When the error is not an error of the recording system, an error code is displayed or printed.

When an error occurs in the facsimile described in JP-A-2006-150889, the status of the recording system, and the state of a sensor, the temperature of the heater, or the timer value after the occurrence of the error is printed or an error code is printed. However, it may not be possible to estimate the cause of the error only from the error code and information indicating the state of the device at the time of the occurrence of the error.

SUMMARY

According to an aspect of the present disclosure, a printing system is provided. The printing system includes a printing device that performs printing and a cartridge that is used for the printing and detachably attached to the printing device. The printing device includes a controller that controls the printing device to perform the printing by executing a plurality of sequences, an error detector that detects an error that is likely to occur in one or more of the plurality of sequences, and a first storage unit in which information is recorded by the controller. The cartridge includes a cartridge storage unit that is a nonvolatile storage unit and in which information is recorded by the controller in a state in which the cartridge is attached to the printing device. The controller records, in the first storage unit, numbers and results of a plurality of sequences including the latest sequence among the plurality of sequences executed. When the error is detected, the controller records, in the cartridge storage unit, numbers of a predetermined number of sequences including the latest sequence among the numbers of the plurality of sequences recorded in the first storage unit.

BRIEF DESCRIPTION OF THE DRAWINGS

FIG. 3 is a flowchart illustrating a control method to be performed when printing is performed in the printing system.

FIG. 4 is a table illustrating an example of information recorded in a first storage unit.

FIG. 5 is a table illustrating an example of information recorded in a second storage unit after processing in step S500.

FIG. 6 is a table illustrating an example of information recorded in a memory chip after processing in step S600.

DESCRIPTION OF EXEMPLARY EMBODIMENTS

A. First Embodiment

A1. Hardware Configuration

Figure 1:
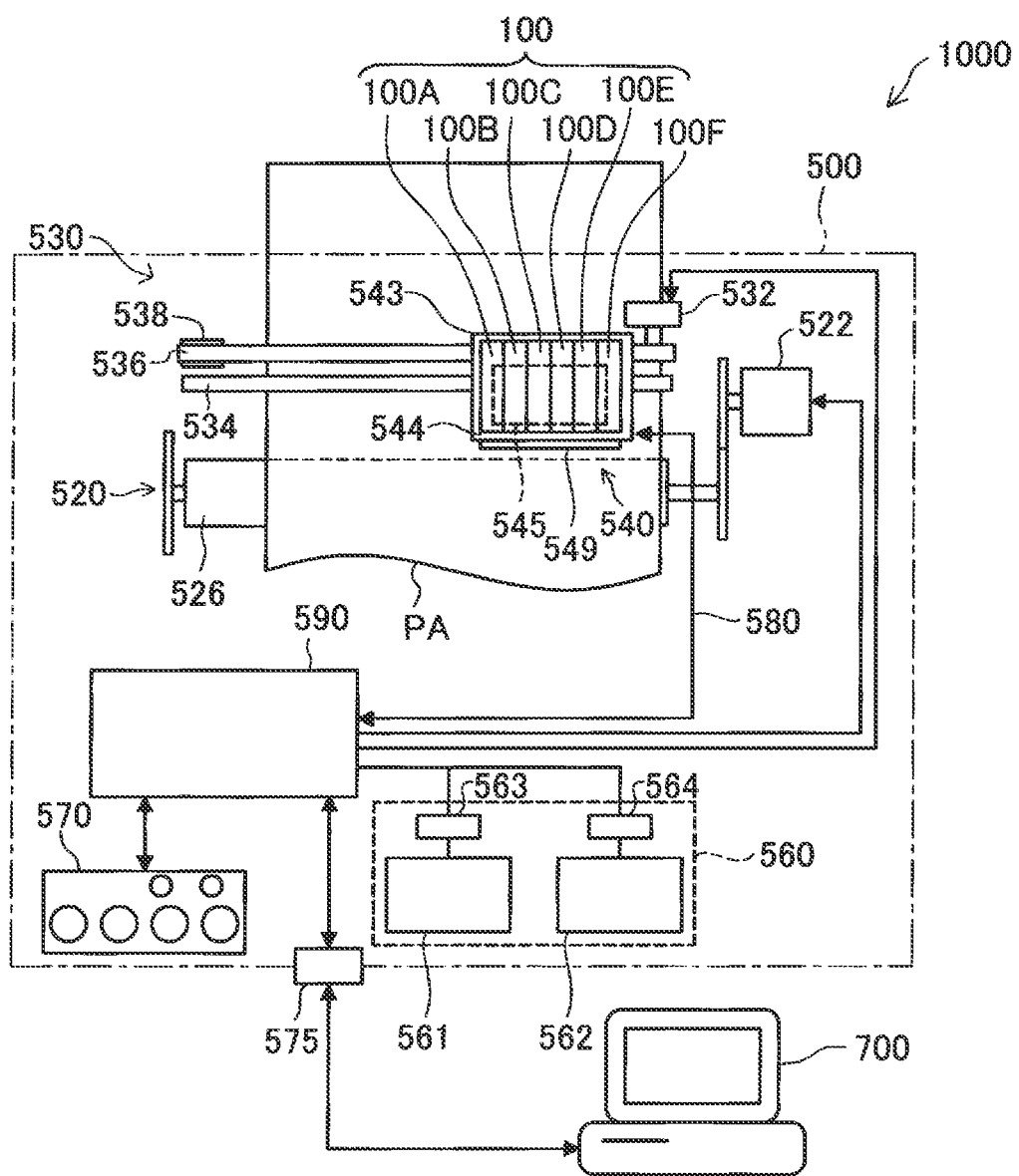
FIG. 1 is an explanatory diagram illustrating a schematic configuration of a printing system.

FIG. 1 is an explanatory diagram illustrating a schematic configuration of a printing system 1000. The printing system 1000 includes a printing device 500, a plurality of ink cartridges 100, and a computer 700.

The printing device 500 performs printing by ejecting ink onto a print medium PA. Specifically, the printing device 500 is an ink jet printer. The plurality of ink cartridges 100A to 100F are detachably attached to the printing device 500. The printing device 500 is connected to the computer 700. The printing device 500 includes an auxiliary scan feeding mechanism 520, a main scan feeding mechanism 530, a head drive mechanism 540, a storage unit 560, an operation unit 570, a connector 575, a bus 580, and a main controller 590.

The auxiliary scan feeding mechanism 520 transports the print medium PA in an auxiliary scan direction. The auxiliary scan feeding mechanism 520 includes a paper feeding motor 522 and a roller 526. The rotation of the paper feeding motor 522 is transmitted to the roller 526 so as to transport the print medium PA in contact with the roller 526 in the auxiliary scan direction.

The main scan feeding mechanism 530 causes a carriage 543 of the head drive mechanism 540 to reciprocate in a main scan direction that is the axis direction of the roller 526. The main scan feeding mechanism 530 includes a carriage motor 532, a sliding shaft 534, a drive belt 536, and a pulley 538.

The sliding shaft 534 is disposed parallel to the axis of the roller 526. The sliding shaft 534 holds the carriage 543 fixed to the drive belt 536 such that the carriage 543 is slidable. The drive belt 536 couples an output shaft of the carriage motor 532 to the pulley 538. The drive belt 536 is an endless belt. The rotational motion of the output shaft of the carriage motor 532 is transmitted as a reciprocation motion to the carriage 543 via the drive belt 536. As a result, the carriage 543 reciprocates along the sliding shaft 534 in the main scan direction.

The head drive mechanism 540 receives ink from the ink cartridges 100 and ejects the ink onto the print medium PA. The head drive mechanism 540 includes the carriage 543.

The ink cartridges 100 are detachably attached to the carriage 543, and the carriage 543 ejects the ink received from the ink cartridges 100 onto the print medium PA. The carriage 543 includes a holder 544, a print head 545, and a sub-control substrate 549.

The holder 544 can hold the six ink cartridges 100A to 100F. In the ink cartridges 100A to 100F, the ink of different colors or types is stored. In the present specification, when the ink cartridges 100A to 100F are described without being distinguished, each of the ink cartridges 100A to 100F is referred to as an ink cartridge 100.

The print head 545 is coupled to the ink cartridge 100 held by the holder 544 and ejects ink received from the ink cartridge 100 onto the print medium PA. The sub-control substrate 549 controls the print head 545.

The main controller 590 records information in the storage unit 560. The storage unit 560 includes a first storage unit 561, a second storage unit 562, a first recording controller 563, and a second recording controller 564.

The main controller 590 records information in the first storage unit 561 and the second storage unit 562. The first storage unit 561 is a volatile storage unit. The second storage unit 562 is a nonvolatile storage unit. Specifically, the first storage unit 561 is a volatile semiconductor memory, and the second storage unit 562 is a nonvolatile semiconductor memory. The second storage unit 562 stores, for example, a computer program to be executed by a central processing unit (CPU) that is a processor of the main controller 590. The computer program in the second storage unit 562 is loaded into the first storage unit 561 and executed by the CPU of the main controller 590. As a result, the main controller 590 implements various functions.

The first recording controller 563 performs processing of writing to the first storage unit 561 and processing of reading from the first storage unit 561 in accordance with an instruction from the CPU of the main controller 590. The first recording controller 563 detects an error that is likely to occur in processing of writing to the first storage unit 561 and an error that is likely to occur in processing of reading from the first storage unit 561. For example, the processing of writing to the first storage unit 561 and the processing of reading from the first storage unit 561 are included in a plurality of sequences executed by the CPU of the main controller 590 in printing.

The second recording controller 564 performs processing of reading from the second storage unit 562 in accordance with an instruction from the CPU of the main controller 590. The second recording controller 564 detects an error that is likely to occur in the processing of reading from the second storage unit 562. For example, the processing of reading from the second storage unit 562 is included in a plurality of sequences executed in printing.

The operation unit 570 is operated by a user to notify the main controller 590 of an instruction from the user (refer to a lower left part of FIG. 1). Specifically, the operation unit 570 includes a liquid crystal panel including a touch panel, and a hardware switch.

The connector 575 is coupled to a connection line connecting the printing device 500 to the computer 700 (refer to a lower central part of FIG. 1). The connector 575 receives an instruction from the user via the computer 700 and transmits the instruction to the main controller 590.

The main controller 590 controls the above-described mechanisms to implement a printing process (refer to a middle left part of FIG. 1). The main controller 590 includes the CPU as the processor. The main controller 590 controls the printing device 500 to perform printing by performing a plurality of sequences.

The main controller 590 is coupled to the sub-control substrate 549 of the carriage 543 and a memory chip 130 of the ink cartridge 100 via the bus 580. The main controller 590 is coupled to the operation unit 570. The main controller 590 is connected to the computer 700 via the connector 575 and a wired connection. The main controller 590 receives a print job from the computer 700 and controls the above-described mechanisms to perform a printing operation based on the content of the received print job.

Figure 2:
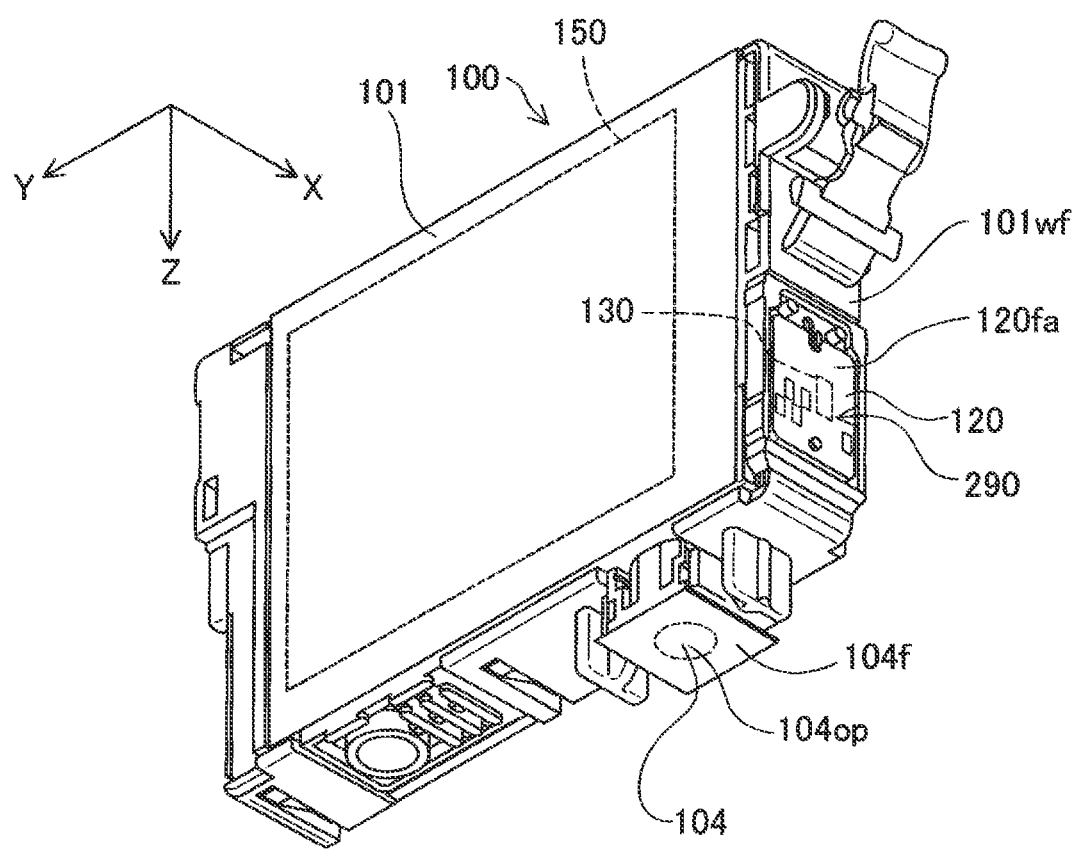
FIG. 2 is a perspective view illustrating a configuration of an ink cartridge.

FIG. 2 is a perspective view illustrating a configuration of the ink cartridge 100. FIG. 2 illustrates an X axis, a Y axis, and a Z axis that are perpendicular to each other. FIG. 2 illustrates the printing device 500 disposed on a horizontal surface parallel to the X direction and the Y direction, and the ink cartridge 100 attached to the printing device 500.

The ink cartridge 100 is detachably attached to the printing device 500. The ink cartridge 100 is attached to the printing device 500 and supplies the ink to the printing device 500. The ink cartridge 100 has a substantially rectangular parallelepiped outer shape. The ink cartridge 100 includes a body 101 for storing the ink and a memory substrate 120.

The body 101 includes an ink chamber 150 and an input supply port 104. The ink chamber 150 stores the ink. The ink supply port 104 communicates with the ink chamber 150 through an ink supply path. The ink within the ink chamber 150 is supplied to the carriage 543 of the printing device 500 through the ink supply port 104 (refer to an upper central part of FIG. 1). An opening 104op of the ink supply port 104 is sealed by a film 104f. By attaching the ink cartridge 100 to the carriage 543, the film 104f is torn and the ink cartridge 100 communicates with the outside of the opening 104op of the ink supply port 104.

The memory substrate 120 is disposed on a front wall 101wf of the body 101. The memory substrate 120 includes the memory chip 130 and a plurality of memory terminals 290.

The memory chip 130 is disposed on a back surface of the memory substrate 120 (refer to a middle right part of FIG. 2). The memory chip 130 is a semiconductor storage device including a processing unit and a memory cell. The memory cell of the memory chip 130 is a nonvolatile storage unit. The processing unit is synchronized with a clock signal having a predetermined frequency and transmitted from the printing device 500 to communicate various types of information with the printing device 500. The main controller 590 of the printing device 500 records information in the memory chip 130 in a state in which the ink cartridge 100 is attached to the printing device 500.

The plurality of memory terminals 290 are disposed on a front surface 120fa of the memory substrate 120. The memory terminals 290 are formed of a conductor such as gold foil. The plurality of memory terminals 290 are coupled to the memory chip 130 via a circuit disposed in the memory substrate 120. The plurality of memory terminals 290 are coupled to terminals disposed in the holder 544 of the printing device 500 in a state in which the ink cartridge 100 is attached to the printing device 500. The terminals disposed in the holder 544 are coupled to the bus 580. Therefore, in a state in which the ink cartridge 100 is attached to the printing device 500, the processing unit of the memory chip 130 of the ink cartridge 100 is coupled to the sub-control substrate 549 and the main controller 590 of the printing device 500.

A2. Processing in Printing System 1000

FIG. 3 is a flowchart illustrating a control method to be performed when printing is performed in the printing system 1000. A process illustrated in FIG. 3 is performed by the main controller 590 of the printing device 500. The process illustrated in FIG. 3 is repeatedly performed after the printing device 500 is turned on.

In step S100, the main controller 590 receives an instruction to perform the process from the user. Specifically, the instruction to perform the process may be input from the user via the operation unit 570 of the printing device 500. Alternatively, the instruction to perform the process may be input to the computer 700 from the user and input to the printing device 500 via the connector 575 of the printing device 500.

In step S200, the main controller 590 executes one of one or more sequences to be executed in response to the instruction received from the user in step S100. When step S200 is performed for the first time after step S100, the first sequence of the one or more sequences to be executed in response to the instruction received in step S100 is executed.

When the main controller 590 completes the one sequence, the main controller 590 records information of the completed sequence in the first storage unit 561 of the printing device 500 (refer to a lower central part of FIG. 1). Specifically, when the main controller 590 completes the one sequence, the main controller 590 records, in the first storage unit 561, a combination of the content SqE of an error that occurred in the sequence, a number SqN of the sequence, a result SqR of the sequence, and the instruction SqI from the user that triggered the sequence, as information of the sequence. The first storage unit 561 is a volatile semiconductor memory (refer to a lower central part of FIG. 1).

FIG. 4 is a table illustrating an example of information recorded in the first storage unit 561. FIG. 4 illustrates a state in which sequences Sq20 to Sq50 among a plurality of sequences Sq20 to Sq90 to be executed in printing after a sequence Sq10 executed in response to the turning on of the printing device 500 are completed. The number of sequences to be executed in the printing is exemplified as 9 to easily understand the techniques and does not reflect the actual number of sequences.

In FIG. 4, the leftmost column indicates the content SqE of an error. In FIG. 4, "-" indicates that a value is not recorded. In the example illustrated in FIG. 4, an error does not occur in the sequences Sq10 to Sq40 and the error occurs in the sequence Sq50. The error that occurs in the sequence Sq50 is a "RUA command error" (refer to a lower left part of FIG. 4). The RUA command error occurs when reading of data from a nonexistent, unallocated, or unmapped memory is tried.

In FIG. 4, the second column from the left indicates sequence numbers SqN. The sequence numbers SqN are numbers that uniquely represent the sequences. To easily understand the techniques, FIG. 4 illustrates sequence names in brackets to the right of the sequence numbers SqN. The sequences may be executed in different processes. The different processes are, for example, printing in black and photographic printing. When the same sequence is executed in different processes, a combination of sequences executed before the execution of the sequence is different from a combination of sequences executed after the execution of the sequence in each of the processes.

In FIG. 4, the third column from the left indicates results SqR of executing the sequences. The results SqR of executing the sequences are information written to the first storage unit 561 as a result of executing the sequences. The result SqR of executing each of the sequences includes a larger amount of information than that of the content SqE of the error and that of each of the numbers SqN of the sequences.

In a write sequence, a result SqR of executing the sequence is a written value. In a determination sequence, a result SqR of executing the sequence is a value indicating the result of the determination. In a read sequence, a result SqR of executing the sequence is a read value. To easily understand the techniques, FIG. 4 illustrates technical meanings of written values instead of specifically recorded values.

In FIG. 4, the rightmost column indicates instructions SqI from the user that triggered the sequences. To easily understand the techniques, FIG. 4 illustrates technical meanings of written values instead of specifically recorded values. In the example illustrated in FIG. 4, the sequence Sq10 is executed in accordance with an instruction SqI for "turning on" from the user, and the sequence Sq20 and the subsequent sequences are executed in accordance with an instruction SqI for "printing" from the user. However, the plurality of sequences executed in response to the instruction SqI for "printing" from the user are terminated by an RUA command error in the sequence Sq50. As illustrated in FIG. 4, in the first storage unit 561, information of a combination of sequences to be executed in response to different instructions SqI from the user may be recorded. In the example illustrated in FIG. 4, the combination of sequences to be executed in response to the different instructions SqI are the sequence Sq10, and the sequences Sq20 to Sq50. The "combination of sequences" may include only one sequence such as the sequence Sq10 executed in accordance with the instruction SqI for "turning on".

After more than a predetermined number of sequences are executed after the turning on of the printing device 500, the main controller 590 performs the following process in step S200. That is, in step S200, when one sequence is completed, the main controller 590 deletes information indicating the earliest recorded sequence and included in information of sequences stored in the first storage unit 561. As a result, in the first storage unit 561, information of a predetermined number of sequences including the latest sequence among a plurality of sequences executed is recorded. An error occurs in the latest sequence among the plurality of sequences executed, and the latest sequence is not appropriately completed. In the example illustrated in FIG. 4, the predetermined number is 5.

In step S300 illustrated in FIG. 3, the main controller 590 determines whether an error occurred in a sequence being executed. The error is detected by the first recording controller 563, the second recording controller 564, or the like (refer to a lower central part of FIG. 1). To easily understand the techniques, detection of another error is not described in the present specification. When an error does not occur, the process proceeds to step S400. When an error occurs, the process proceeds to step S500. In the example illustrated in FIG. 4, an error does not occur in the sequences Sq10 to Sq40 (refer to a left part of FIG. 4).

In step S400 illustrated in FIG. 3, the main controller 590 determines whether all the one or more sequences to be executed in response to the instruction received from the user are already executed. When any of the one or more sequences to be executed is not executed, the process returns to step S200. In step S200, the main controller 590 executes the next sequence among the one or more sequences to be executed in response to the instruction received from the user in step S100. After the sequence is completed, the main controller 590 records information of the completed sequence in the first storage unit 561.

In the example illustrated in FIG. 4, first, an instruction for turning on is received from the user in step S100 (refer to an upper right part of FIG. 4). After the sequence Sq10 is executed in step S200, step S300 is executed and it is determined that all the one or more sequences are already completed in step S400. Then, the process illustrated in FIG. 4 ends.

After that, when an instruction for printing is newly received from the user in step S100, step S200 and step S400 are repeatedly performed unless an error occurs in the sequence. In this manner, the sequences Sq20 to Sq40 are executed (refer to the second to fourth rows from the top in FIG. 4). In the example illustrated in FIG. 4, an RUA error occurs during the execution of the sequence Sq50 in step S200, the process proceeds from step S300 to step S500 (refer to the lowest row illustrated in FIG. 4).

In step S500 illustrated in FIG. 3, the main controller 590 records, in the second storage unit 562 of the printing device 500, the numbers SqN of the predetermined number of sequences Sq10 to Sq50 including the latest sequence Sq50 among the numbers SqN of the plurality of sequences Sq10 to Sq50 recorded in the first storage unit 561. The second storage unit 562 is a nonvolatile semiconductor memory (refer to a lower central part of FIG. 1). In the first embodiment, the predetermined number is 5.

The main controller 590 records, in the second storage unit 562, the content SqE of the error in the predetermined number of sequences Sq10 to Sq50 including the latest sequence Sq50 within the content SqE of the error in the plurality of sequences Sq10 to Sq50 recorded in the first storage unit 561.

The main controller 590 records, in the second storage unit 562, results SqR of the predetermined number of sequences Sq10 to Sq50 including the latest sequence Sq50 among results of the plurality of sequences Sq10 to Sq50 recorded in the first storage unit 561.

Further, the main controller 590 records, in the second storage unit 562, the instructions SqI from the user for the predetermined number of sequences Sq10 to Sq50 including the latest sequence Sq50 among the instructions SqI from the user for the plurality of sequences Sq10 to Sq50 recorded in the first storage unit 561.

FIG. 5 is a table illustrating an example of the information recorded in the second storage unit 562 of the printing device 500 after the processing in step S500. After the processing in step S500, in the second storage unit 562 of the printing device 500, the content SqE of the error in the predetermined number of sequences, that is, the five sequences among the plurality of sequences recorded in the first storage unit 561, the numbers SqN of the sequences, the results SqR of the sequences, and the instructions SqI from the user are recorded.

In step S600 illustrated in FIG. 3, the main controller 590 records, in the memory chip 130 of the ink cartridge 100, the numbers SqN of the predetermined number of sequences Sq10 to Sq50 including the latest sequence Sq50 among the numbers SqN of the plurality of sequences Sq10 to Sq50 recorded in the first storage unit 561. In the first embodiment, the predetermined number is 5. In this case, the numbers SqN of the sequences Sq10 to Sq50 continuously executed are recorded. The numbers SqN of the sequences Sq10 to Sq50 continuously executed are the numbers SqN of the sequences continuously recorded in the first storage unit 561.

The main controller 590 records, in the memory chip 130, the content SqE of the error in the predetermined number of sequences Sq10 to Sq50 including the latest sequence Sq50 within the content SqE of the error in the plurality of sequences Sq10 to Sq50 recorded in the first storage unit 561.

FIG. 6 is a table illustrating an example of the information recorded in the memory chip 130 after the processing in step S600. After the processing in step S600, in the memory chip 130 of the printing device 500, the content SqE of the error in the five sequences Sq10 to Sq50 among the plurality of sequences recorded in the first storage unit 561 and the numbers SqN of the five sequences Sq10 to Sq50 among the plurality of sequences recorded in the first storage unit 561 are recorded.

By performing the process, the plurality of sequences Sq10 to Sq50 executed before the error occurs can be known after the occurrence of the error based on the numbers SqN of the sequences recorded in the memory chip 130. Therefore, as compared with a case where only the state of the printing device 500 after the error occurs and an error code of the error are recorded, it is possible to quickly and correctly estimate the cause of the occurrence of the error.

For example, a service representative can know, based on the numbers SqN of the sequences recorded in the memory chip 130, which information was tried to be read from the memory in which process in accordance with a read command that caused an error. As a result, for example, when an error occurs in a read sequence, it is possible to identify that the error occurred in the read sequence due to a certain write sequence executed before the execution of the read sequence. The causes of errors that occur in the read sequence and the write sequence are, for example, noise that occurred in communication and poor contact with the memory terminals 290.

In the present embodiment, the numbers SqN of the plurality of sequences Sq10 to Sq50 including the latest sequence Sq50 when the error occurs are recorded in the second storage unit 562 of the printing device 500 and the memory chip 130 of the ink cartridge 100 (refer to S600 illustrated in FIG. 3 and a middle right part of FIG. 2). Therefore, unlike a case where the numbers SqN of the plurality of sequences Sq10 to Sq50 are recorded only in the second storage unit 562 of the printing device 500, when the ink cartridge 100 is sent to a person other than the user of the printing device 500, the person can easily know the plurality of sequences Sq10 to Sq50 executed before the error occurs in the printing.

In the present embodiment, the numbers SqN of the plurality of continuous sequences Sq10 to Sq50 including the latest sequence Sq50 among the numbers SqN of the plurality of sequences Sq10 to Sq50 recorded in the first storage unit 561 are recorded in the memory chip 130 (refer to S600 illustrated in FIG. 3 and a left part of FIG. 6).

Therefore, the plurality of sequences Sq10 to Sq50 continuously executed before the error occurs can be known after the occurrence of the error based on the numbers SqN of the sequences recorded in the memory chip 130 of the ink cartridge 100. Therefore, it is possible to accurately estimate the cause of the occurrence of the error, as compared with a case where numbers of sequences discretely selected from among a plurality of sequences executed are recorded in the memory chip 130, for example, a case where one out of three among a plurality of sequences executed before an error occurs in printing is recorded in the memory chip 130. In addition, processing for recording information is easy.

In step S600 illustrated in FIG. 3, the main controller 590 does not record, in the memory chip 130, the results SqR of the plurality of sequences Sq10 to Sq50 recorded in the first storage unit 561 (refer to the third column from the left of FIG. 4).

The result SqR of executing each of the sequences includes a larger amount of information than that of the content SqE of the error and that of each of the numbers SqN of the sequences. Therefore, the capacity of the memory chip 130 can be reduced by performing the above-described process, as compared with a case where the results SqR of the sequences Sq10 to Sq50 are recorded in the memory chip 130.

In addition, the main controller 590 does not record, in the memory chip 130, the instructions SqI from the user for the plurality of sequences Sq10 to Sq50 recorded in the first storage unit 561 (refer to the fourth column from the left of FIG. 4).

Each of the instructions SqI from the user includes a larger amount of information than that of the content SqE of the error and that of each of the numbers SqN of the sequences. Therefore, the capacity of the memory chip 130 can be reduced by performing the above-described process, as compared with a case where the instructions from the user for the sequences are recorded in the memory chip 130.

In such an aspect, when an error does not occur due to the replacement of the ink cartridge 100 after the occurrence of an error, it is possible to perform printing with an ink cartridge 100 attached to the printing device 500 after the replacement. The ink cartridge 100 used when the error occurs can be sent to the manufacturer of the printing device 500. The manufacturer of the printing device 500 can analyze the cause of the error based on the information stored in the memory chip 130 of the ink cartridge 100.

In the present embodiment, the following effects can be obtained by recording the information described above in the second storage unit 562 of the printing device 500 (refer to step S500 illustrated in FIG. 3, and FIG. 6).

That is, the cause of the occurrence of an error that cannot be accurately estimated only from information recognized from numbers SqN of sequences recorded in the memory chip 130 of the ink cartridge 100 can be accurately estimated based on results SqR of the sequences recorded in the second storage unit 562 of the printing device 500 (refer to FIG. 6).

In addition, the cause of the occurrence of an error that cannot be accurately estimated only from information recognized from numbers SqN of sequences recorded in the memory chip 130 of the ink cartridge 100 and results SqR of the sequences recorded in the second storage unit 562 of the printing device 500 can be accurately estimated (refer to FIG. 6). That is, the cause of the occurrence of the error can be accurately estimated based on an instruction SqI provided from the user and recorded in the second storage unit 562 of the printing device 500 (refer to FIG. 6).

In such an aspect, when an error occurs, the manufacturer of the printing device 500 recalls the ink cartridge and analyzes the cause of the error. Then, when it is not possible to identify the cause of the error, the manufacturer dispatches a service representative to the user of the printing device 500 and can identify the cause of the occurrence of the error based on results SqR of sequences recorded in the second storage unit 562 of the printing device 500 and an instruction SqI from the user. When the printing device 500 is large, the service representative may acquire information from the second storage unit 562 of the printing device 500, bring the information back to a service station, and analyze the cause of the error. When the printing device 500 is small, the service representative may bring the printing device 500 back to the service station or arrange delivery of the printing device 500 to the service station.

The ink cartridge 100 according to the present embodiment is also referred to as a "cartridge". The first recording controller 563 and the second recording controller 564 are also referred to as "error detectors". The operation unit 570 and the connector 575 are also referred to as "interface units". The main controller 590 is also referred to as a "controller". The memory chip 130 is also referred to as a "cartridge storage unit".

B. Other Embodiments

B1. Other Embodiment 1

(1) In the embodiment described above, information regarding the same number of sequences is recorded in the first storage unit 561, the second storage unit 562, and the memory chip 130 (refer to Sq10 to Sq50 illustrated in FIGS. 4 to 6). The number of sequences is 5. However, the number of sequences of which information is recorded in the first storage unit of the printing device, the number of sequences of which information is recorded in the second storage unit of the printing device, and the number of sequences of which information is recorded in the cartridge storage unit of the cartridge may be other numbers, such as 3, 6, and 8. In addition, the number of sequences of which information is recorded in the first storage unit of the printing device, the number of sequences of which information is recorded in the second storage unit of the printing device, and the number of sequences of which information is recorded in the cartridge storage unit of the cartridge may be different. However, it is preferable that the number of sequences of which information is recorded in the second storage unit of the printing device be equal to or larger than the number of sequences of which information is recorded in the cartridge storage unit of the cartridge.

(2) In the embodiment described above, in step S600 illustrated in FIG. 3, the main controller 590 does not record, in the memory chip 130, the results SqR of the plurality of sequences Sq10 to Sq50 recorded in the first storage unit 561 (refer to the third column from the left of FIG. 4, and FIG. 6). However, in step S600 illustrated in FIG. 3, the main controller 590 may record the results SqR of the sequences in the memory chip 130.

In the embodiment described above, in step S600 illustrated in FIG. 3, the main controller 590 does not record, in the memory chip 130, the instructions SqI from the user for the plurality of sequences Sq10 to Sq50 recorded in the first storage unit 561 (refer to the rightmost column illustrated in FIG. 4, and FIG. 6). However, in step S600 illustrated in FIG. 3, the main controller 590 may record, in the memory chip 130, the instructions SqI from the user to execute the sequences.

(3) In the embodiment described above, the techniques disclosed herein are described using the RUA command error as an error to be detected (refer to a lower left part of FIG. 4). However, the error to be detected may be another error such as a paper feeding error, an error regarding reciprocation of the carriage, or an error regarding ejection of ink. The techniques disclosed herein are more effective when the techniques disclosed herein are applied to recording of an error of sequences that may be executed in different types of processes.

(4) In the embodiment described above, the printing device 500 is described as an ink jet printer to which the ink cartridge 100 is attached. However, as the cartridge detachably attached to the printing device, another cartridge such as a toner cartridge or a drum cartridge to be attached to a laser printer may be used. However, it is preferable that the cartridge detachably attached to the printing device be used for printing.

B2. Other Embodiment 2

In the embodiment described above, in the memory chip 130 of the ink cartridge 100, the numbers SqN of the predetermined number of continuous sequences Sq10 to Sq50 are recorded (refer to FIG. 6). However, numbers of discontinuous sequences among a plurality of sequences executed may be recorded in the memory chip 130, for example, one out of three of a plurality of sequences executed before an error occurs or only a sequence that satisfies a predetermined condition may be recorded in the memory chip 130.

B3. Other Embodiment 3

In the embodiment described above, in step S500 illustrated in FIG. 3, the main controller 590 records, in the second storage unit 562, the results SqR of the predetermined number of sequences Sq10 to Sq50 including the latest sequence Sq50 among the results SqR of the plurality of sequences Sq10 to Sq50 recorded in the first storage unit 561 (refer to the third column from the left of FIG. 5). However, the controller may not record, in the second storage unit, the results of the sequences recorded in the first storage unit.

B4. Other Embodiment 4

In the embodiment described above, in step S500 illustrated in FIG. 3, the main controller 590 records, in the second storage unit 562, the instructions SqI from the user for the predetermined number of sequences Sq10 to Sq50 including the latest sequence Sq50 among the instructions SqI from the user for the plurality of sequences Sq10 to Sq50 recorded in the first storage unit 561 (refer to the rightmost column illustrated in FIG. 5). However, the controller may not record, in the second storage unit, the instructions from the user to start the sequences recorded in the first storage unit.

B5. Other Embodiment 5

In the embodiment described above, in step S600 illustrated in FIG. 3, the main controller 590 does not record, in the memory chip 130, the results SqR of the plurality of sequences Sq10 to Sq50 recorded in the first storage unit 561 (refer to the third column from the left of FIG. 4, and FIG. 6). However, the controller may record, in the cartridge storage unit, the results of the sequences recorded in the first storage unit.

C. Other Embodiments

The present disclosure is not limited to the embodiments described above and can be implemented in various forms without departing from the gist of the present disclosure. For example, the present disclosure can be implemented in the following forms. The technical features of the above-described embodiments corresponding to technical features in aspects described below can be appropriately replaced or combined in order to solve some or all of the problems described in the present disclosure or obtain some or all of the effects described in the present disclosure. In addition, the technical features can be removed unless the technical features are described as essential features in the present specification.

(1) According to an aspect of the present disclosure, a printing system is provided. The printing system includes a printing device that performs printing and a cartridge that is used for the printing and detachably attached to the printing device. The printing device includes a controller that controls the printing device to perform the printing by executing a plurality of sequences, an error detector that detects an error that is likely to occur in one or more of the plurality of sequences, and a first storage unit in which information is recorded by the controller. The cartridge includes a cartridge storage unit that is a nonvolatile storage unit and in which information is recorded by the controller in a state in which the cartridge is attached to the printing device. The controller records, in the first storage unit, numbers and results of a plurality of sequences including the latest sequence among the plurality of sequences executed. When the error is detected, the controller records, in the cartridge storage unit, numbers of a predetermined number of sequences including the latest sequence among the numbers of the plurality of sequences recorded in the first storage unit.

According to this aspect, a plurality of sequences executed before an error occurs can be known after the occurrence of the error based on numbers of sequences recorded in the cartridge storage unit. Therefore, it is possible to accurately estimate the cause of the occurrence of the error, as compared with a case where only the state of the printing device after the occurrence of the error and an error code of the error are recorded.

In addition, in the aspect described above, numbers of a plurality of sequences including the latest sequence when an error occurs are recorded in the cartridge storage unit of the cartridge. Therefore, unlike a case where numbers of a plurality of sequences are recorded only in the printing device, when the cartridge is sent to a person other than the user of the printing device, the person can easily know a plurality of sequences executed before an error occurs in printing.

(2) In the printing system according to the aspect described above, when the error is detected, the controller may record, in the cartridge storage unit, numbers of a plurality of continuous sequences including the latest sequence among the numbers of the plurality of sequences recorded in the first storage unit.

According to this aspect, a plurality of sequences continuously executed before an error occurs in printing can be known after the occurrence of the error based on numbers of sequences recorded in the cartridge storage unit of the cartridge. Therefore, it is possible to accurately estimate the cause of the occurrence of an error, as compared with a case where numbers of sequences discretely selected from among a plurality of sequences executed before the error occurs are recorded in the cartridge storage unit.

(3) In the printing system according to the aspect described above, the printing device may include a volatile storage unit as the first storage unit, and a second storage unit that is a nonvolatile storage unit and in which information is recorded by the controller. When the error is detected, the controller may record, in the second storage unit, results of the predetermined number of sequences including the latest sequence among the results of the plurality of sequences recorded in the first storage unit.

According to this aspect, the cause of the occurrence of an error that cannot be accurately estimated only from information recognized from numbers of sequences recorded in the cartridge storage unit of the cartridge can be accurately estimated based on results of sequences recorded in the second storage unit of the printing device.

(4) In the printing system according to the aspect described above, the printing device may include an interface unit that receives one or more instructions from a user, and the controller may record, in the first storage unit, the one or more instructions from the user that triggered a plurality of sequences including the latest sequences among the plurality of sequences executed. When the error is detected, the controller may record, in the second storage unit, an instruction from the user for the predetermined number of sequences including the latest sequence among the one or more instructions from the user for the plurality of sequences recorded in the first storage unit.

According to this aspect, the cause of the occurrence of an error that cannot be accurately estimated only from information recognized from numbers and results of sequences can be accurately estimated based on an instruction received from a user and recorded in the second storage unit of the printing device.

(5) In the printing system according to the aspect described above, when the error is detected, the controller may not record, in the cartridge storage unit, the results of the sequences recorded in the first storage unit.

According to this aspect, the capacity of the cartridge storage unit can be reduced, as compared with a case where the numbers and results of the predetermined number of sequences including the latest sequence among the numbers and results of the plurality of sequences recorded in the first storage unit are recorded in the cartridge storage unit.

(6) A method of controlling a printing system including a printing device that performs printing and a cartridge that is used for the printing and detachably attached to the printing device includes (a) recording, in a first storage unit included in the printing device, numbers and results of a plurality of sequences including the latest sequence among a plurality of sequences executed in the printing device, and (b) recording, in a cartridge storage unit that is included in the cartridge attached to the printing device and is a nonvolatile storage unit, numbers of a predetermined number of sequences including the latest sequence among the numbers of the plurality of sequences recorded in the first storage unit when an error occurs in a sequence.

(7) In the control method according to the aspect described above, (b) may include recording, in the cartridge storage unit, numbers of a plurality of continuous sequences including the latest sequence among the numbers of the plurality of sequences recorded in the first storage unit when the error occurs.

(8) In the control method according to the aspect described above, the printing device may include a volatile storage unit as the first storage unit, and a second storage unit that is a nonvolatile storage unit and in which information is recorded. The control method may include (c) recording, in the second storage unit, results of the predetermined number of sequences including the latest sequence among the results of the plurality of sequences recorded in the first storage unit when the error occurs.

(9) In the control method according to the aspect described above, the printing device may include an interface unit that receives one or more instructions from a user. The control method may include (d) recording, in the first storage unit, the one or more instructions from the user that triggered a plurality of sequences including the latest sequence among the plurality of sequences executed in the printing device, and (e) recording, in the second storage unit, an instruction from the user for the predetermined number of sequences including the latest sequence among the one or more instructions from the user for the plurality of sequences recorded in the first storage unit when the error occurs.

(10) In the control method according to the aspect described above, in (b), the results of the sequences recorded in the first storage unit may not be recorded in the cartridge storage unit.

The present disclosure can be implemented in various forms other than the printing system and the method of controlling the printing system. For example, the present disclosure can be implemented in the forms of a method of recording an error, a method of analyzing a cause of an error, a computer program that implements these methods, a non-transitory recording medium having the computer program recorded therein, and the like.

What is claimed is:

1. A printing system comprising:
a printing device that performs printing; and
a cartridge that is used for the printing and detachably attached to the printing device, wherein
the printing device includes
a controller that controls the printing device to perform the printing by executing a plurality of sequences,
an error detector that detects an error that is likely to occur in one or more of the plurality of sequences, and
a first storage unit in which information is recorded by the controller,
the cartridge includes a cartridge storage unit that is a nonvolatile storage unit and in which information is recorded by the controller in a state in which the cartridge is attached to the printing device,
the controller records, in the first storage unit, numbers and results of a plurality of sequences including the latest sequence among the plurality of sequences executed, and
when the error is detected, the controller records, in the cartridge storage unit, numbers of a predetermined number of sequences including the latest sequence among the numbers of the plurality of sequences recorded in the first storage unit.

2. The printing system according to claim 1, wherein
when the error is detected, the controller records, in the cartridge storage unit, numbers of a plurality of continuous sequences including the latest sequence among the numbers of the plurality of sequences recorded in the first storage unit.

3. The printing system according to claim 1, wherein
the printing device includes
a nonvolatile storage unit as the first storage unit, and
a second storage unit that is a nonvolatile storage unit and in which information is recorded by the controller, and
when the error is detected, the controller records, in the second storage unit, results of the predetermined number of sequences including the latest sequence among the results of the plurality of sequences recorded in the first storage unit.

4. The printing system according to claim 3, wherein
the printing device includes an interface unit that receives one or more instructions from a user,
the controller records, in the first storage unit, the one or more instructions from the user that triggered a plurality of sequences including the latest sequence among the plurality of sequences performed, and
when the error is detected, the controller records, in the second storage unit, an instruction from the user for the predetermined number of sequences including the latest sequence among the one or more instructions from the user for the plurality of sequences recorded in the first storage unit.

5. The printing system according to claim 1, wherein when the error is detected, the controller does not record, in the cartridge storage unit, the results of the sequences recorded in the first storage unit.

6. A method of controlling a printing system including a printing device that performs printing and a cartridge that is used for the printing and detachably attached to the printing device, the control method comprising:
   (a) recording, in a first storage unit included in the printing device, numbers and results of a plurality of sequences including the latest sequence among a plurality of sequences executed in the printing device; and
   (b) recording, in a cartridge storage unit that is included in the cartridge attached to the printing device and is a nonvolatile storage unit, numbers of a predetermined number of sequences including the latest sequence among the numbers of the plurality of sequences recorded in the first storage unit when an error occurs in a sequence.

7. The control method according to claim 6, wherein
   (b) includes recording, in the cartridge storage unit, numbers of a plurality of continuous sequences including the latest sequence among the numbers of the plurality of sequences recorded in the first storage unit when the error occurs.

8. The control method according to claim 6, wherein
the printing device includes
a nonvolatile storage unit as the first storage unit, and
a second storage unit that is a nonvolatile storage unit and in which information is recorded, and
the control method further comprises (c) recording, in the second storage unit, results of the predetermined number of sequences including the latest sequence among the results of the plurality of sequences recorded in the first storage when the error occurs.

9. The control method according to claim 8, wherein
the printing device includes an interface unit that receives one or more instructions from a user, and
the control method further comprises:
   (d) recording, in the first storage unit, the one or more instructions from the user that triggered a plurality of sequences including the latest sequence among the plurality of sequences executed in the printing device; and
   (e) recording, in the second storage unit, an instruction from the user for the predetermined number of sequences including the latest sequence among the one or more instructions from the user for the plurality of sequences recorded in the first storage unit when the error occurs.

10. The control method according to claim 6, wherein
in (b), the results of the sequences recorded in the first storage unit are not recorded in the cartridge storage unit.

* * * * *